Nov. 26, 1968  B. L. FROST  3,412,631
CHANGE-SPEED AXLE

Filed Sept. 19, 1966  2 Sheets-Sheet 1

INVENTOR
BARRY L. FROST
BY Robert H. Johnson
ATTORNEY

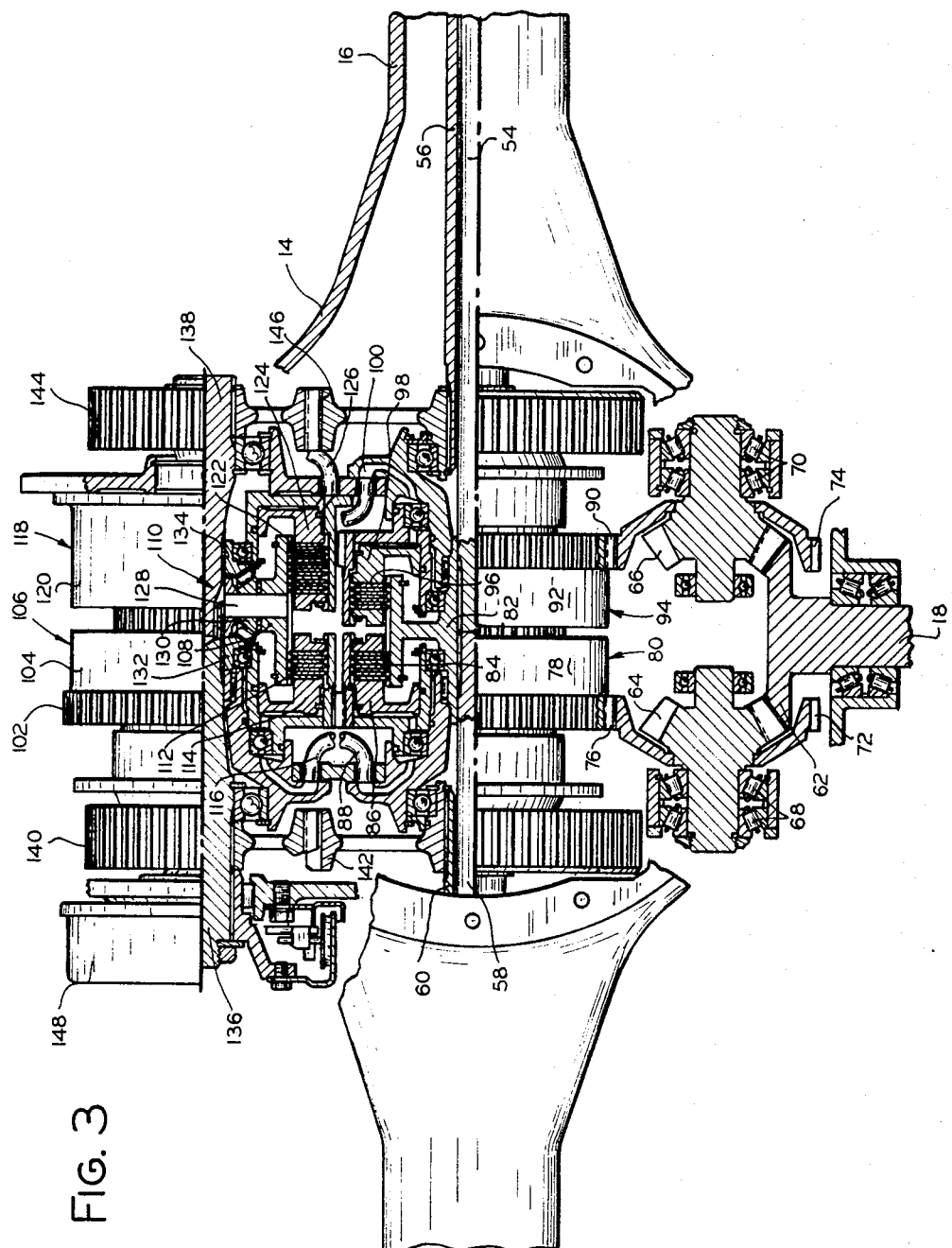

United States Patent Office 3,412,631
Patented Nov. 26, 1968

3,412,631
CHANGE-SPEED AXLE
Barry L. Frost, Jackson, Mich., assignor to Clark Equipment Company, a corporation of Michigan
Filed Sept. 19, 1966, Ser. No. 580,399
10 Claims. (Cl. 74—695)

ABSTRACT OF THE DISCLOSURE

A change-speed drive axle having a pair of planetary gear sets, each with an input element and a reaction element. The input elements can be driven in either direction of rotation conjointly and the reaction elements are interconnected by a differential and can be driven in one direction of rotation, held from rotation or permitted to rotate in opposite directions.

A principal object of my invention is to provide an improved change-speed axle.

In carrying out my invention in a preferred embodiment I provide a pair of planetary gear sets each having a sun gear and a ring gear. The sun gears of both planetary gear sets can be connected to the axle input to be driven in either direction of rotation. The ring gears of the planetary gear sets can be held from rotation or connected to the power input to the axle to be driven in one direction of rotation. A differential is provided between the ring gears to provide for differential action during turning. A brake is operatively connected to one of the ring gears of the planetary gear sets so that the differential may be locked out.

The above and other objects, features and advantages of my invention will be more readily understood by a person skilled in the art when the following detailed description is taken in conjunction with the accompanying drawing wherein:

FIGURE 2 is a fragmentary cross section of a portion of the axle shown in FIG. 1 showing to advantage the mechanism at the hub end and FIGURE 3 is a fragmentary view partially in section showing the mechanism contained in the banjo portion of the axle of FIG. 1.

Figure 1:
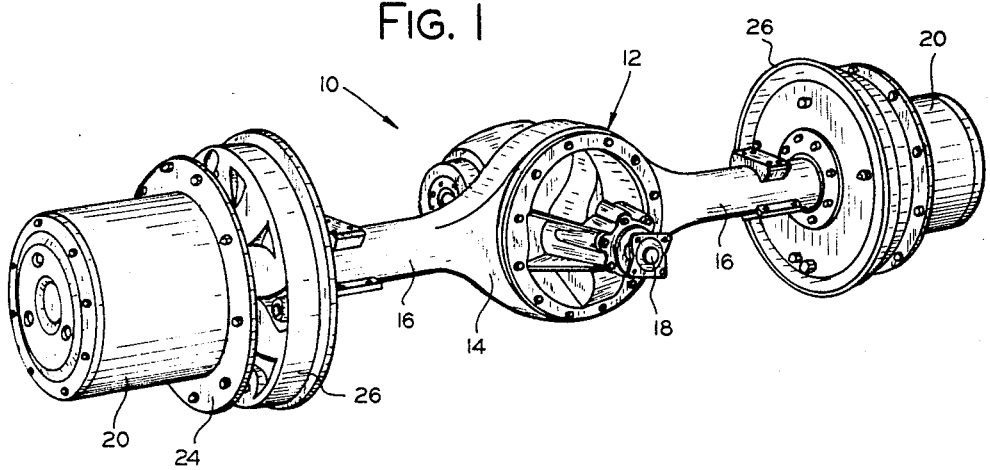
FIGURE 1 is a perspective view of my novel axle.

Referring now to FIG. 1, the reference numeral 10 denotes generally a change-speed axle having an axle housing 12. Axle housing 12 includes a banjo portion 14 from which a pair of housing arms 16 and an input shaft 18 extend. A pair of hubs 20 are mounted at opposite ends of arms 16 for rotation in bearings 22. Each hub 20 includes a mounting flange 24 to which a wheel may be attached. Also, a conventional type brake 26 is provided between each hub 20 and the adjacent portion of arm 16.

Figure 2:
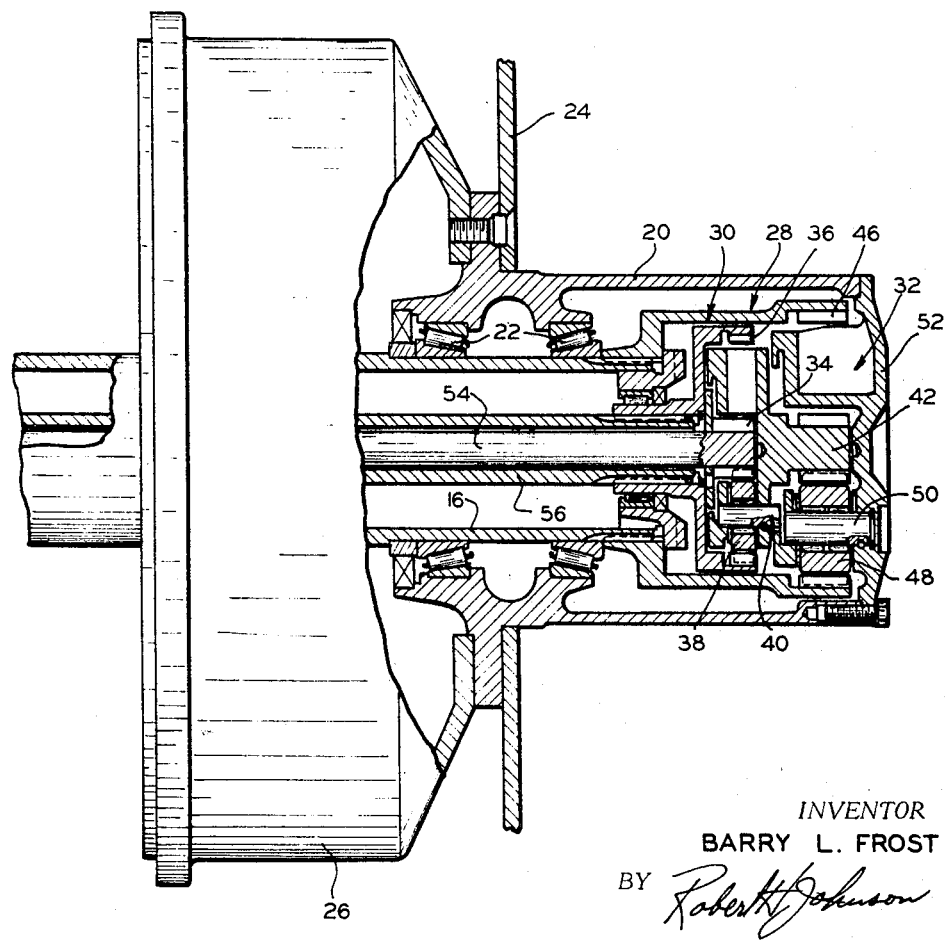

Located in each hub 20 is a dual gear reduction assembly 28 (FIG. 2) which includes a first planetary gear set 30 and a second planetary gear set 32 connected in series with planetary gear set 30. Planetary gear set 30 includes a first element or sun gear 34 and a second element or ring gear 36. Disposed between and meshing with sun gear 34 and ring gear 36 is a plurality of planet gears 38 which are mounted for rotation on stub shafts 40 which are held in a planet carrier. 42 At this point it will be appreciated that planet carrier 42 could be connected directly to wheel hub 20 in order to drive a wheel mounted thereon; however, in order to provide a further speed reduction it is found desirable to utilize a second planetary gear set 32 which includes a sun gear 44 connected to planet gear carrier 42, ring gear 46 and a plurality of planet gears 48 which mesh with sun gear 44 and ring gear 46 and are mounted for rotation on stub shafts 50 which are anchored in an end plate 52 that forms a portion of hub 20.

It will be noted that ring gear 46 is splined to the adjacent end of arm 16 so that it is held from rotation. Sun gear 34 is splined to a shaft 54 and ring gear 36 is splined to a sleeve shaft 56.

The reduction gear assembly located in the other wheel hub is identical with the one just described and includes a sun gear which corresponds to sun gear 34 and is connected to a shaft 58 and a ring gear which corresponds to ring gear 36 and is connected to a sleeve shaft 60.

Referring now to FIG. 3, it will be seen that a bevel gear 62 is integral with shaft 18 and meshes with a pair of bevel gears 64 and 66 which are mounted for rotation in bearings 68 and 70, as shown. Connected to bevel gear 64 for rotation therewith is a spur gear 72. Similarly, a spur gear 74 is connected to bevel gear 66 for rotation therewith. At this point it will be noted that due to the relationship of the bevel gears that spur gear 72 will rotate in one direction while spur gear 74 rotates in the opposite direction for any given rotation of input shaft 18.

Meshing with gear 72 is a gear 76 which is integral with the drum 78 of a multiple plate fluid actuated clutch 80. Clutch 80 includes a hub 82 which is splined to shafts 54 and 58 so that they function as a single unitary shaft. Clutch 80 also includes a plurality of interleaved friction plates 84, part of which are splined to hub 82 and part of which are splined to drum 78. Adjacent one end of plates 84 is a piston 86 to which pressurized fluid can be supplied through a conduit 88. When pressurized fluid is supplied to piston 86 the plates 84 are compressed so that clutch 80 is engaged so that gear 76 and shafts 54 and 58 are coupled together for conjoint rotation.

Gear 74 meshes with a gear 90 which is integral with the drum 92 of a multiple plate fluid actuated clutch 94. Clutch 94 includes hub 82 which is also common with clutch 80 and a plurality of interleaved friction plates 96. Part of the plates are splined to hub 82 and the remainder are splined to drum 92. A piston 98 is located adjacent one end of plates 96 and is arranged to be supplied with pressurized fluid through a conduit 100. Supplying pressurized fluid to piston 98 causes plates 96 to be compressed, whereby clutch 94 is engaged so that gear 90 is coupled to shafts 54 and 58 for conjoint rotation therewith.

By selectively engaging clutches 80 and 94 shafts 54 and 58 can be driven in either direction of rotation for any given direction of rotation of input shaft 18.

Meshing with gear 76 is a gear 102 which is integral with the drum 104 of a multiple plate fluid actuated clutch 106. Clutch 106 includes a member 108 which functions as a hub and also as a power input for a differential 110. Disposed between member 108 and drum 104 is a plurality of interleaved friction plates 112 which are carried in part by drum 104 and in part by member 108. A piston 114 is disposed adjacent one end of plates 112 and is arranged to be supplied with pressurized fluid through a conduit 116. When pressurized fluid is supplied to piston 114 clutch 106 is engaged so that gear 102 is connected to member 108 for conjoint rotation therewith.

Located adjacent clutch 106 is a multiple plate fluid actuated brake 118. Brake 118 includes a stationary drum 120 and member 108 which is common with clutch 106. Disposed intermediate member 108 and drum 120 is a plurality of interleaved friction plates 122 which are carried in part by drum 120 and in part by member 108. Located at one end of plates 122 is a piston 124 which when supplied with pressurized fluid via a conduit 126 serves to compress plates 122, thereby engaging brake 118 and holding member 108 from rotation.

As pointed out before member 108 is the input element of a differential 110. Member 108 has a plurality of radially inwardly extending stub shafts 128 on each of which a pinion gear 130 is mounted for rotation. Gears 130 are disposed between and mesh with a pair of side gears 132 and 134. Side gear 132 is splined to a shaft 136 for rotation therewith and side gear 134 is splined to a shaft 138 for rotation therewith. Connected to shaft 136 for rotation therewith is a gear 140 which meshes with another gear 142 that is splined to sleeve shaft 60 for rotation therewith. Similarly, a gear 144 is connected to shaft 138 for rotation therewith and meshes with a gear 146 which is splined to sleeve shaft 56 for rotation therewith.

A conventional type shoe brake 148 is connected to shaft 136 and is operable when engaged to hold shaft 136 from rotation.

In order to enable persons skilled in the art to better understand my invention I will now explain the operation of it. It will be assumed that the axle shown in FIG. 1 is embodied in a vehicle as a drive axle thereof and that it is arranged so that clockwise rotation of hubs 20 as viewed from the left end in FIG. 1 drives the vehicle in a forward direction. It will further be assumed that input shaft 18 is connected to a prime mover by means of a propellor shaft and is driven in a clockwise direction as viewed from the front end thereof in FIG. 1.

Assuming now that the operator wishes to have the greatest mechanical advantage at wheel hubs 20 he will manipulate suitable controls to supply pressurized fluid to clutch 80 and brake 118 to cause them to engage. In this condition of operation shafts 54 and 58 will be driven in a clockwise direction, as viewed from the left in FIG. 3, and shafts 56 and 60 will be held from rotation (assuming substantially equal resistance to rotation of hubs 20) because differential member 108 is held from rotation by brake 118. As a consequence, the sun gears of the first planetary gear sets will be driving the planet gears causing them to roll around the ring gears which are fixed.

In order to provide an intermediate drive the operator manipulates suitable controls to direct pressurized fluid to engage clutch 94 and clutch 106. In this condition of operation shafts 54 and 58 are being driven in a counterclockwise direction as viewed from the left in FIG. 3 and sleeve shafts 56 and 60 are being driven in a clockwise direction of rotation. As a result the sun gear of the first planetary gear set is rotating in one direction and the ring gear thereof is rotating in the opposite direction which provides an intermediate speed at the wheel hubs.

If the operator desires to have the highest possible speed at the wheel hubs, then he manipulates suitable controls to direct pressurized fluid to engage clutches 80 and 106. As a result shafts 54 and 58 and sleeve shafts 56 and 60 are both driven in the same direction of rotation which in the present case is clockwise, as viewed from the left in FIG. 3.

Regardless of which of the above-described three conditions of operation the axle is in, differential 110 permits relative rotation of shaft 136 relative to shaft 138 so that hubs 20 can turn at different speeds when the vehicle associated with the axle is negotiating a turn. In the case of heavy mud, for example, it may be desirable to eliminate the differential action between the wheel hubs of the axle. This can be accomplished by engaging brake 148 to hold shaft 136 from rotation when the axle is conditioned for low drive. That is, when clutch 80 and brake 118 are engaged.

Axle 10 can also be conditioned for reverse drive without reversing the direction of drive to input shaft 18 simply by engaging clutch 94 and brake 118. In this condition of operation shafts 54 and 58 are driven in a counterclockwise direction, as viewed from the left in FIG. 3, and sleeve shafts 56 and 60 are held from rotation. As a result the wheel hubs 20 are driven in a counterclockwise direction as viewed from the left in FIG. 1.

It is also possible to eliminate the differential action of differential 110 when axle 10 is conditioned for reverse drive simply by also engaging brake 148.

In the above description of operation it is assumed that both hubs 20 of axle 10 encounter substantially equal resistance to rotation due to the wheels connected thereto engaging the ground. Thus, there will be a resistance to rotation of planet gears 38 about sun gears 34 so that there will be a reaction force imposed on ring gears 36 which are connected to shafts 56 and 60. These reaction forces will tend to rotate shafts 56 and 60 in the same direction. When axle 10 is conditioned for low or reverse drive brake 118 is engaged and holds member 108 from rotation. As a result shafts 56 and 60 cannot rotate in the same direction, but can rotate in opposite directions which permits hubs 20 to run at different speeds when there is such a requirement, e.g., when negotiating a turn. When axle 10 is conditioned for intermediate or high drive, clutch 106 is engaged so that member 108 of differential 110 is being driven. As a result, shafts 56 and 60 are being driven in the same direction in opposition to the reaction forces mentioned above. Both shafts 56 and 60 will be driven at the same speed during straight ahead operation, but differential 110 will permit them to be driven at different speeds when there is such a requirement, e.g., when negotiating a turn.

While only a single preferred embodiment of my invention has been set forth in the above-detailed description, it will be readily understood that various modifications and changes can be made to my invention without departing from the scope and spirit thereof. Consequently, the limits of my invention should be determined from the following appended claims.

I claim:
1. A change-speed axle comprising first and second planetary gear sets, each gear set including a first element and a second element, a first shaft connecting the said first elements of both gear sets, first and second gears mounted for rotation on the said first shaft, power input means connected to the said first and second gears to drive the said first gear in one direction of rotation and drive the said second gear in the opposite direction of rotation, a first clutch operable to connect the said first gear to the said first shaft for conjoint rotation, a second clutch operable to connect the said second gear to the said first shaft for conjoint rotation, a second shaft, first means drivingly connecting the said second shaft to the said second element of the said first gear set, a third shaft, second means drivingly connecting the said third shaft to the said second element of the said second gear set, a differential connecting the said second and third shafts, the said differential including a rotatable input element, a third gear mounted for rotation on the said second shaft and meshing with the said first gear, a third clutch operable to connect the said third gear to the said differential input element for conjoint rotation and a first brake operable to hold the said differential input element from rotation.

2. A change-speed axle as set forth in claim 1 wherein the said first elements are sun gears and the said second elements are ring gears.

3. A change-speed axle as set forth in claim 1 wherein the said power input means includes an input shaft, a first bevel gear drivingly connected to the said input shaft, second and third bevel gears meshing with the said first bevel gear so that rotation of the said first bevel gear causes the said second and third bevel gears to rotate oppositely from each other, a fourth gear drivingly connected to the said second bevel gear and meshing with the said first gear and a fifth gear drivingly connected to the said third bevel gear and meshing with the said second gear.

4. A change-speed axle as set forth in claim 1 wherein the said clutches and brake are of the multiple plate fluid actuated type.

5. A change-speed axle as set forth in claim 1 wherein the said first connecting means includes a first sleeve shaft coaxial with the said first shaft, a sixth gear fixed to the said first sleeve shaft and a seventh gear fixed to the said second shaft and meshing with the said sixth gear and the said second connecting means includes a second sleeve shaft coaxial with the said first shaft, an eighth gear fixed to the said second sleeve shaft and a ninth gear fixed to the said third shaft and meshing with the said eighth gear.

6. A change-speed axle as set forth in claim 1 wherein the said differential includes first and second side gears connected to the said second and third shafts, respectively, and the said input element includes at least one gear carried thereby which meshes with the said side gears.

7. A change-speed axle as set forth in claim 1 and including a second brake operable to hold the said second shaft from rotation.

8. A change-speed axle as set forth in claim 2 wherein the said first connecting means includes a first sleeve shaft coaxial with the said first shaft, a sixth gear fixed to the said first sleeve shaft and a seventh gear fixed to the said second shaft and meshing with the said sixth gear and the said second connecting means includes a second sleeve shaft coaxial with the said first shaft, an eighth gear fixed to the said second sleeve shaft and a ninth gear fixed to the said third shaft and meshing with the said eighth gear.

9. A change-speed axle as set forth in claim 8 wherein the said differential includes first and second side gears connected to the said second and third shafts, respectively, and the said input element includes at least one gear carried thereby which meshes with the said side gears.

10. A change-speed axle as set forth in claim 9 wherein the said power input means includes an input shaft, a first bevel gear drivingly connected to the said input shaft, second and third bevel gears meshing with the said first bevel gear so that rotation of the said first bevel gear causes the said second and third bevel gears to rotate oppositely from each other, a fourth gear drivingly connected to the said second bevel gear and meshing with the said first gear and a fifth gear drivingly connected to the said third bevel gear and meshing with the said second gear, and a second brake operable to hold the said second shaft from rotation.

References Cited
UNITED STATES PATENTS

| | | | |
|---|---|---|---|
| 2,377,354 | 6/1945 | Merritt | 74—69.5 X |
| 2,692,514 | 10/1954 | O'Leary | 74—710.5 |
| 2,876,657 | 3/1959 | Allin et al. | 74—710.5 |
| 2,974,545 | 3/1961 | Davies et al. | 74—720.5 |
| 3,050,164 | 8/1962 | Bowen et al. | 74—720.5 X |

ARTHUR I. McKEON, *Primary Examiner.*